July 24, 1962 H. L. McDERMOTT 3,045,321
ABRADING DEVICES AND METHOD OF MAKING THEM
Filed April 15, 1955 2 Sheets-Sheet 1
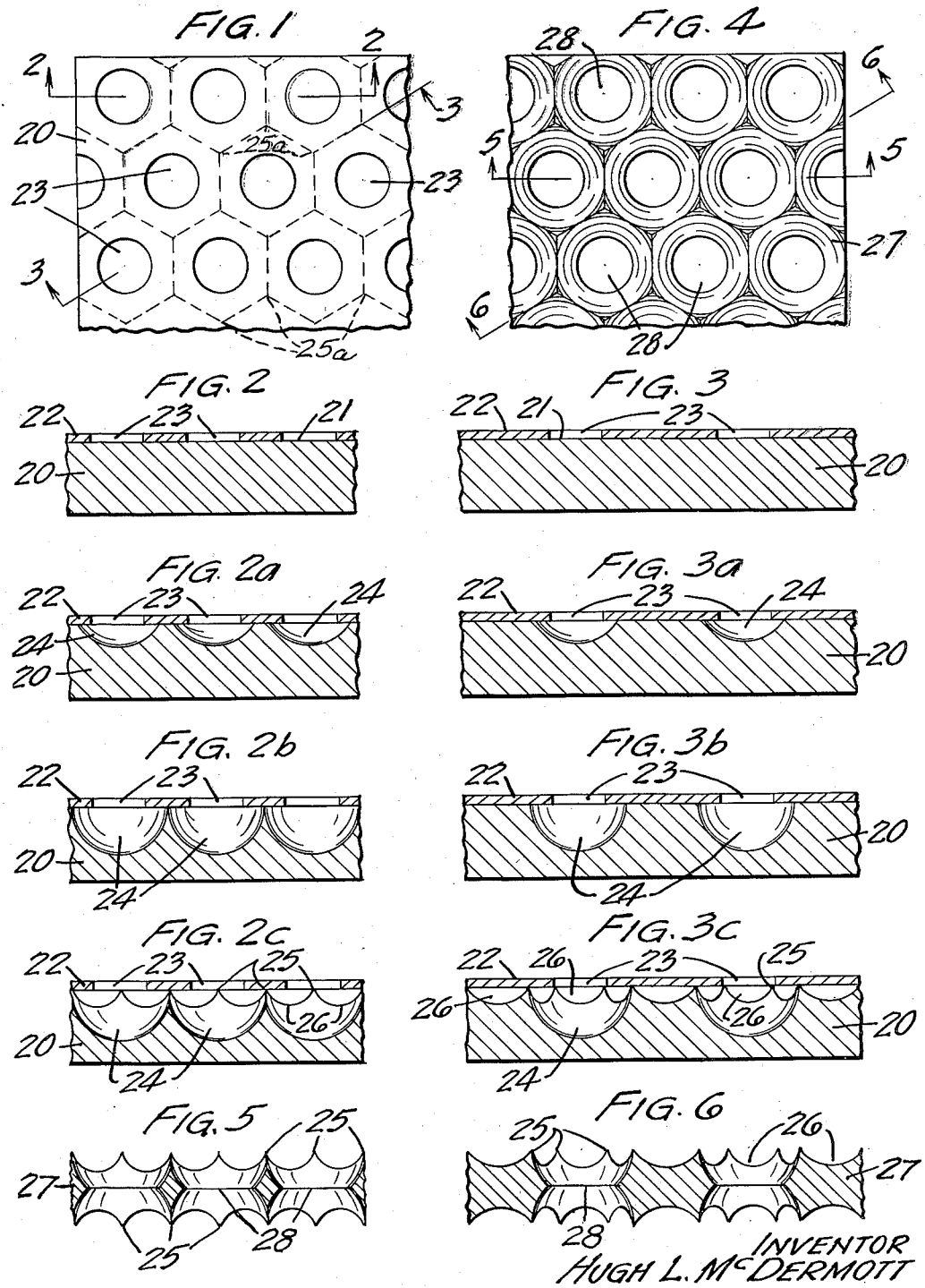
INVENTOR
HUGH L. McDERMOTT
BY John E. Stryker
ATTORNEY

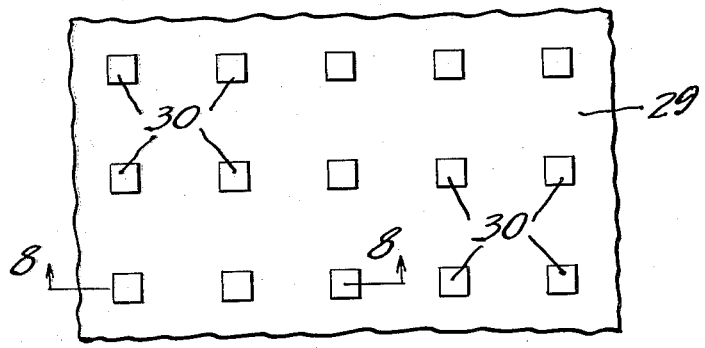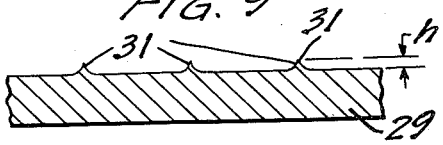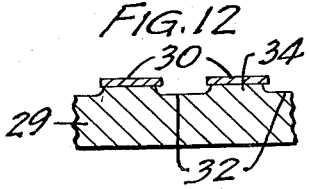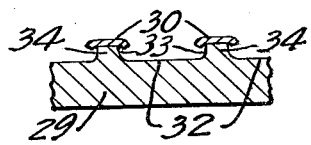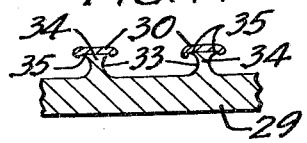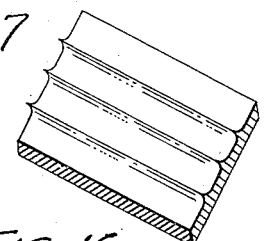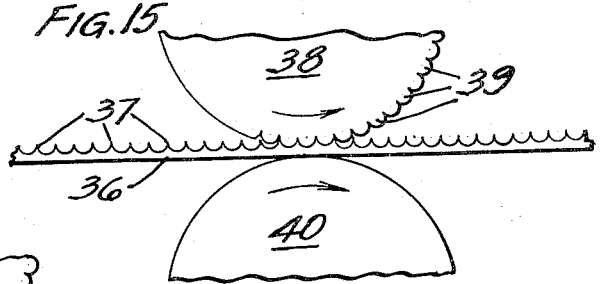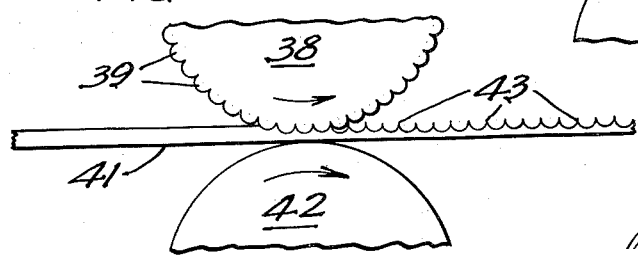

United States Patent Office 3,045,321
Patented July 24, 1962

3,045,321
ABRADING DEVICES AND METHOD OF MAKING THEM
Hugh L. McDermott, St. Louis Park, Minn., assignor to Buckbee-Mears Company, St. Paul, Minn., a corporation of Minnesota
Filed Apr. 15, 1955, Ser. No. 501,666
7 Claims. (Cl. 29—78)

This invention relates to abrading devices and methods of making them and has for its principal object to provide such devices or tools having cutting elements of unique and highly efficient shapes separated by depressions of concave shape and controlled depth.

Another object is to provide a novel method of producing abrasive surfaces which comprises applying to a smooth surface of a blank a suitable pattern of etching resist material defining areas to be etched and then progressively etching the exposed areas until a multiplicity of sharp cutting elements are formed between depressions.

A particular object is to provide abrading devices which are characterized by:

(1) Points or edges of sharp cutting elements extending to a common elevation and at uniform or controlled distance one from the others.

(2) Great durability and long useful life of the cutting elements due to their inherent mechanical strength.

(3) Depression surfaces between cutting elements of concavely curved or spherical form which minimize lodging of the cuttings.

(4) Cutting elements disposed in any desired pattern for optimum performance in either directional cutting, e.g., as on a belt sander, or for non-directional use, e.g., as a substitute for grit coated paper or cloth abrasive material.

Other objects will appear and be more fully pointed out in the following specification and claims.

Such abrading devices are adapted to be furnished in a wide range of grades and sizes of abrading and cutting elements wherein the heights, sharpness and spacing of the points or edges are varied to suit the materials to be worked and character of the surface desired on the work.

I have discovered that by etching a repetitive pattern composed of dots or lines, for example, of suitable width defined by a pattern of etching resist coating on the surface of a blank adapted to be etched and prolonging the etching treatment through openings in the resist pattern until the etched depressions merge at the original surface of the blank, sharp pointed pyramids, cones or ridges having excellent abrading and cutting characteristics are formed. The surfaces defining the sides of each point or ridge are concave and intersect at acute angles.

My improved abrasive surfaces may be formed on one or both sides of metal blanks or sheet material, or on other blank material of suitable hardness. The blank material should have a substantially smooth or level surface to receive the treatment. Abrasive surfaces of the character described may be obtained by etching the blank device or tool directly or as a mechanical reproduction of an embossed surface of a master die or roll, the surface of which is a reverse impression of a die having cutting elements formed by etching.

Starting with a clean, plane surface upon which the cutting elements are to be formed, I proceed in a manner well known in the photo-engraving art to produce a pattern of etching resistant material on the surface of the blank. Either photomechanical or other printing procedure for forming the pattern may be used.

According to my method, the areas of the blank which are to form teeth, ridges or other cutting elements are selectively coated with a material which prevents the etching fluid from contacting and acting on them from the surface and other areas of the blank are left exposed for the etching treatment. The etching fluid first acts on the surface areas which are not protected by the resist material, and as the etching proceeds the material not protected by the resist is removed in all directions resulting in the formation of depressions between the several elemental resist-covered areas of the blank. These newly exposed surfaces are removed simultaneously as the etching fluid deepens and widens each depression. Where sharp ridges or points are desired, the etching process is stopped when the resist has been completely undercut. The remaining material will then have a typical cross section defined by concave, approximately spherical surfaces intersecting at acute angles at the center point or line of each area of resist and at a common elevation usually corresponding to the original surface of the blank.

The pattern of the resist material which is coated on the blank is varied according to the character of the cutting elements that are desired. For example, a pattern of isolated areas where the etching is to start may be formed in an otherwise continuous etching resist coating, or isolated areas of the etching resist coating may be formed on the otherwise exposed surface areas of the blank.

An unlimited variety of patterns or configurations may be employed in solid and/or line patterns resulting either in point and/or line teeth. One or more surfaces of an object may be made abrasive, either entirely or in selected areas. For example, a sheet may be prepared with a relatively coarse fast cutting surface on one side, or both sides, or one side may be prepared with a finer finishing surface than the other. The pattern may be made non-directional or directional. For example, if the material is to be used in an orbital or random direction, a non-directional pattern is formed on the blank. For such items as abrasive belts and band files, a very directional pattern may be used. The pattern or patterns may be so arranged that the resulting material is perforated, thereby imparting self cooling properties and minimizing the lodging of cuttings in the depressions.

My improved cutting elements may be formed on any material that is suited to etching treatment. Most of the known suitable materials are metals. Steels of various compositions and hard alloys are best suited for use as the blank material where long life and adaptability to the cutting of hard substances such as glass, ceramics, some of the plastics and other metals is required. For example, stainless steel sheets or plates and mild steels adapted to be hardened subsequent to the etching treatment have been used successfully as the blank or body of the abrading devices. After a blank of mild steel or iron has been formed with cutting elements by etching treatment, the product may be given a hardening treatment, e.g., case hardening treatment. For abrading wood and forming smooth surfaces on any of the softer materials, the blank may be composed of one of the softer metals, e.g., nickel, aluminum, copper or brass, or any suitable alloy. All such metals and alloys have crystalline structures.

Economy in the use of metal is obtained by using thin sheets or strips of metal as the blank material. Sheets ranging from .002 inch to about .02 inch thick have adequate strength and desirable flexibility for many abrading uses. The sides of saw blades of various types may be formed with my improved abrading elements in order to minimize the binding of the saws in cuts formed thereby. Thus hand saws, band saws, back saws, scroll saws and power saws of various types may be formed with the abrasive surfaces by applying my improved masking and etching treatment.

The invention will be best understood by reference to the accompanying drawings in which fragmentary portions of abrading devices of various grades are shown diagrammatically and at various stages of the process for making them.

In the drawing:

FIGURE 1 is a plan view showing one of the many suitable resist patterns that may be formed on blank plates or sheets;

FIG. 2 is a section taken on the line 2—2 of FIG. 1;

FIGS. 2a and 2b are sectional views showing typical cavities formed by the etching treatment at two intermediate stages;

FIG. 2c shows the finished product (before the resist has been removed) resulting from the resist pattern of FIGS. 1 and 2;

FIG. 3 is a section taken on the line 3—3 of FIG. 1;

FIGS. 3a, 3b and 3c are sectional views, taken on the line 3—3 of FIG. 1, showing later stages in the etching treatment corresponding to those illustrated in FIGS. 2a, 2b and 2c respectively;

FIG. 4 is a plan view illustrating a finished abrading device of the type wherein the etching is carried completely through the material from both sides;

FIG. 5 is a fragmentary section taken on the line 5—5 of FIG. 4;

FIG. 6 is a section taken on the line 6—6 of FIG. 4;

FIG. 7 is a plan view showing another type of resist pattern wherein the resist areas are isolated on exposed areas;

FIG. 8 is a section taken on the line 8—8 of FIG. 7;

FIG. 9 is a typical cross sectional view showing the finished cutting elements resulting from the resist pattern illustrated in FIGS. 7 and 8;

FIG. 10 is a sectional view showing another type of resist pattern designed to increase the depth and sharpness of the cutting elements;

FIG. 11 is a sectional view showing the finished product resulting from the pattern of FIG. 10;

FIGS. 12, 13 and 14 illustrate successive etching stages in the formation of cutting elements having undercut sides;

FIG. 15 shows diagrammatically one step in the method of reproducing from an etched abrasive surface a pattern which is to be reproduced from a die or roll;

FIG. 16 illustrates a succeeding step in the process for forming embossed surfaces of abrading character on a blank which is passed between rolls, and FIG. 17 is a greatly enlarged perspective view showing a fragmentary portion of one of my abrading devices having cutting elements of an elongated ridge form.

Referring to FIGS. 1–3, a body 20 of metal or other etchable material is shown with a plane surface 21 upon which a coating 22 of etching-resist material has been applied and caused to adhere. This coating defines a pattern of resist material comprising a multiplicity of openings 23 exposing equal elemental areas of the body 20. The openings 23, for example, may comprise circular holes .015 inch in diameter spaced on .027 inch centers in the hexagonal pattern indicated. By etching through the openings 23 cavities 24 are formed and these are progressively enlarged, as indicated in FIGS. 2a, 2b, 2c, 3a, 3b and 3c, until the cavities intersect at the original surface 21 of the body 20. Thus a multiplicity of sharp pointed cutting elements 25, severally located at the corners 25a of the hexagonal figures indicated in broken lines in FIG. 1, are formed. Each sharp element 25 is connected with each of the adjacent elements 25 by ridges 26 of concavely curved form. The cavities 24 (FIGS. 2c and 3c) between the elements 25 and ridges 26 are approximately spherical in form. All of the cutting elements 25 rise to a common elevation thereby forming a level, discontinuous cutting or abrading surface.

FIGS. 4, 5 and 6 illustrate one of my abrading devices which has been formed by etching through duplicate patterns of resist applied to opposite sides of a plane metal blank. Resist patterns, similar to that shown in FIG. 1, were applied to both sides of a sheet of metal of approximately .02 inch thickness. Thereafter the etching treatment was applied and prolonged until the etched cavities had penetrated completely through the blank from opposite sides. In this manner the metal sheet, indicated generally at 27, was formed with a multiplicity of sharp pointed cutting elements 25 at both sides and cavities 24 of approximately spherical shape were joined from opposite sides to form openings 28. Such openings render the material self cooling in use and also minimize the lodging of cuttings in the cavities.

FIGS. 7 and 8 illustrate a modified resist pattern on a blank 29. Small square resist areas 30 are shown isolated one from another on an otherwise exposed smooth surface of the blank. When a blank carrying this type of resist pattern is subjected to etching treatment of the required duration, the resist areas 30 become completely undercut and as a result, a multiplicity of pointed cutting elements 31 are formed on the blank. The height of the individual cutting elements above the surrounding surface of the material is a function of the width of the resist areas 30. The wider the resist areas the greater the depth of etching that is required to produce sharp cutting elements.

This control feature of my invention is further illustrated by a comparison of FIGS. 10 and 11 with FIGS. 8 and 9. FIG. 8 may illustrate, for example, a resist pattern wherein the individual resist areas have a width of .007 inch, whereas FIG. 10 may illustrate a pattern wherein the resist areas are .018 inch diameter. The height of the cutting elements 31 at the end of the etching (FIG. 9) was found to be between .002 and .003 inch. Points 31a, FIG. 11, produced from the wider (.018 in.) resist islands were found to be approximately .006 inch high.

It will be evident that any required number of cutting elements per square inch on the abrading device may be obtained by selection of the number of areas of resist that are provided on the surface of the blank.

By manipulating the conditions of etching, undercutting of the original surface may be obtained at the sides of each cutting element. This is illustrated in FIGS. 12, 13 and 14. FIG. 12 shows resist islands 30 on the body 29 and etched depressions 32 which have partially undercut the resist islands. In FIG. 13 the depressions 32 have been deepened and enlarged laterally at 33 to an extent where the overlying resist is retarding the rate of etching near the top of each element 34. FIG. 14 shows the condition at the end of the etching treatment. The sides 33 of the cavities have been extended and the depth of the cavities has been increased but the overhanging portions of the resist have protected the original surface of the protrusions 34. As a result sharp cutting edges 35 protrude at opposite sides and substantially horizontally from each element 34. In order to obtain this result a resist material is used which is tough enough to remain in place at the sides of the protrusions formed by etching and the etchant is applied to the surface of the blank at relatively high velocities. It may be applied in the form of a high pressure spray or by high velocity splashing. The high velocity etching fluid increases the rate of penetration of the etching action into the material being etched and causes the undercutting of the original surface as illustrated in FIG. 14.

As indicated in FIG. 14, the flat tops of the cutting elements 34 are so small that the total area of these top surfaces represents only a small fraction of the total abrasive area and substantially the entire surface for contact with the work has an etched crystalline texture. Consequently the cutting elements 34 as well as the sharp points and ridges of the other forms of the invention readily penetrate the surface of the work to be abraded when applied under moderate pressure.

FIGS. 15 and 16 illustrate an alternate method of forming an abrasive surface on suitable blank material. This method involves the use of a hard metal plate 36 having a toothed surface 37 which may be formed by the masking and etching procedure hereinbefore described. This plate is used as a master to form a reverse embossed surface 39 on a soft steel roll 38. The embossing may be performed by passing the plate 36 under sufficiently high pressure between the roll 38 and a backing roll 40, with the toothed surface 37 in contact with the roll 38. The roll 38 having the embossed surface 39 is then subjected to hardening treatment which may be a general heat treatment or a surface hardening such as case hardening treatment of conventional type. The hardened roll 38 is then used to emboss a surface of a relatively soft blank 41. The blank may be forced under suitable pressure between the roll 38 and a pressure roll 42, for example. This produces an embossed surface 43 on the blank 41. The resulting toothed surface may be given hardening treatment to impart greater durability. Abrading devices produced by this alternate method have protruding cutting elements which are similar in many respects to those produced by direct etching. However, unlike my preferred method, involving direct etching, it is not feasible to undercut the side surfaces of the cutting elements by the alternate procedure.

Microscopic examination of my preferred etched abrasive surfaces formed on material such as steel show that such surfaces are composed of the exposed natural crystals of the material having sharp corners and edges which constitute the primary cutting elements. The larger cutting elements 25, 31, 31a, or edges 35 may be referred to as "secondary cutting elements." The presence of such primary cutting elements has the outstanding advantages of greatly increasing the rate of cutting, and in obtaining smooth polished surfaces on materials that are difficult to abrade or cut with ordinary abrasives. Examples are glasses of certain compositions, ceramics and many thermosetting and thermoplastic materials, including the phenolics and urea derivatives, polystyrene and polyethylene.

For best results the etching should be completed simultaneously beneath each of the several elemental resist areas. This desirable result may be obtained readily by making all of the elemental resist areas of equal size or area and by applying equal etching treatment to all areas to be etched. Each cutting point or edge is thereby located at the center point or edge of a resist area, irrespective of variations in the spacing of the several resist areas on a particular abrasive device. As indicated in FIG. 1, the elemental areas of the resist coating, severally indicated by the broken line hexagons, are all of equal size or area and in FIGS. 7, 8 and 10 the isolated resist areas 30 are all of equal size. For many uses a random pattern of resist areas variously spaced over the surface of the blank is desirable. Such non-uniform spacing of the resist areas does not cause variations in the elevations of the cutting elements if the size of such areas are equal over the entire surface of the blank to be etched.

Thorough comparative tests have demonstrated that amazing results are obtained by the use of my abrading devices. The cutting action is amazingly fast and the finished surfaces on the work are unusually smooth and devoid of undesirable scratches. These characteristics, combined with the great durability and inherent mechanical strength of the individual cutting elements, make the use of my improved abrasive devices economically advantageous.

The effectiveness of my devices in abrading various difficult-to-abrade materials at unusually high rates while forming uniquely smooth finished surfaces on the work, as well as the durability and inherent mechanical strength of the individual cutting elements are the result of a combination of their sharp tops in all forms of the invention, their uniformity in height, their symmetrical shape, the perpendicular position of the axes of the individual cutting elements and their etched crystalline surfaces which extend over substantially the entire face of the device for contact with the work to be abraded.

The term "printing" as used in the claims has the broad significance of making a reproduction of a pre-existing pattern or design. This, in accordance with graphic art usage, includes photo-printing and printing by the use of a printing press of any type or from silk screens or other stencils. I thus obtain accurate control of the location, shape and size of the resist covered areas and bare areas of the metal blank. By printing the resist patterns I make it possible to provide cutting elements of any required uniform shape projecting equally, in selected patterns and sizes and variously spaced to meet the peculiar requirements of abrading devices for any particular use.

I claim:

1. An abrading device comprising, a metal body having on at least one face a multiplicity of fine widely spaced sharp abrasive points of substantially cone or pyramid shape and of substantially identical and symmetrical shape in cross section rising from a common base plane, the axis of symmetry of each of said points being normal to said plane, said points being of equal height and having sharp tops adapted to penetrate the work to be abraded, extending to a common elevation above said base plane, opposite sides of each of said points being defined by concavely arcuate surfaces of substantially equal radius, said base plane being tangentially disposed to said arcuate surfaces, and substantially the entire area of said body for contact with the work to be abraded being composed of exposed natural metal crystals having sharp projecting corners and edges of the character produced by etching.

2. An abrading device comprising, a flexible metal sheet having on at least one face a multiplicity of fine widely spaced abrasive elements of substantially identical and symmetrical shape in cross section rising from a common base plane, the axis of symmetry of each of said elements being normal to said plane, said elements being of equal height and having sharp tops adapted to penetrate the work to be abraded, extending to a common elevation above said base plane, opposite sides of each of said elements being defined by concavely arcuate surfaces of substantially equally radius, said base plane being tangentially disposed to said arcuate surfaces, and substantially the entire area of said body for contact with the work to be abraded being composed of exposed natural metal crystals having sharp corners and edges of the character produced by etching.

3. The method of forming an abrading device from a metal sheet having smooth surfaces on both sides which comprises, printing on each of said smooth surfaces a preexisting pattern of etching resistant material defining equally spaced exposed areas separated by resist areas covering the remaining abrading surface of the sheet and with the exposed areas on one side in registry with those on the other side, and subjecting the blank to etching treatment through the exposed areas at both sides to form depressions and of such duration as to run the depressions together to form a multiplicity of perforations in the sheet and sharp pointed cutting elements projecting normally to the respective sides of the sheet.

4. The method of forming on a smooth surface of a metal blank a multiplicity of sharp abrasive elements extending to a common depth below said surface and in predetermined spaced relation one to another which comprises, printing on said surface a predetermined pattern of etching resist material, said pattern comprising a multiplicity of elemental expose areas of said surface and a multiplicity of elemental resist covered areas of a uniform width, and subjecting the blank to etching treatment through said exposed areas of such duration as to form depressions which substantially completely undercut said resist covered areas whereby the depressions are extended to form sharp tops on said elements approximately at the original surface of the blank.

5. A method in accordance with claim 4 in which the pattern of etching resist material comprises, a multiplicity of dot-like exposed areas of equal size each surrounded by one of said elemental resist covered areas.

6. A method in accordance with claim 4 in which the pattern of etching resist material comprises a multiplicity of dot-like resist covered areas of predetermined substantially uniform size separated on all sides by exposed areas of said surface.

7. An abrading device comprising, a metal body having on at least one face a multiplicity of fine widely spaced abrasive elements of substantially identical and symmetrical shape in cross section rising from a common base plane, and projecting equally from a common plane surface coincident with said common base plane, the axis of symmetry of each of said elements being normal to said plane, said elements having sharp tops adapted to penetrate the work to be abraded, extending to a common elevation above said base plane, opposite sides of each of said elements being defined by concavely arcuate surfaces of substantially equal radius, said base plane being tangentially disposed to said arcuate surfaces, and substantially the entire area of said body for contact with the work to be abraded being composed of exposed natural metal crystals having sharp projecting corners and edges of the character produced by etching.

References Cited in the file of this patent

UNITED STATES PATENTS

| Number | Name | Date |
|---|---|---|
| 43,658 | Clavel | July 26, 1864 |
| 94,503 | Nicholson | Sept. 7, 1869 |
| 507,071 | Huff | Oct. 17, 1893 |
| 852,873 | Davidson | May 7, 1907 |
| 927,249 | Kiefer | July 6, 1909 |
| 1,177,326 | Hewitt | Mar. 28, 1916 |
| 1,314,450 | Whyte | Aug. 26, 1919 |
| 1,329,088 | Leitner | Jan. 27, 1920 |
| 1,784,866 | Fahrenwald | Dec. 16, 1930 |
| 1,802,793 | Turner | Apr. 28, 1931 |
| 2,058,912 | Reid | Oct. 27, 1936 |
| 2,143,063 | Fetterolf | Jan. 10, 1939 |
| 2,203,200 | Komarek | June 4, 1940 |
| 2,255,269 | Perrine | Sept. 9, 1941 |
| 2,369,960 | Gage et al. | Feb. 20, 1945 |
| 2,440,963 | Luce | May 4, 1948 |
| 2,480,354 | Bonnet | Aug. 30, 1949 |
| 2,498,982 | Davies | Feb. 28, 1950 |
| 2,552,455 | Pond | May 8, 1951 |
| 2,663,821 | Law | Dec. 22, 1953 |
| 2,705,765 | Geer | Apr. 5, 1955 |
| 2,708,376 | Booth | May 17, 1955 |
| 2,739,047 | Sanz | Mar. 20, 1956 |
| 2,762,035 | Triman | Sept. 4, 1956 |
| 2,762,149 | Mears | Sept. 11, 1956 |
| 2,810,190 | Schmidgall | Oct. 22, 1957 |